(12) United States Patent
Yoon et al.

(10) Patent No.: US 8,595,568 B2
(45) Date of Patent: Nov. 26, 2013

(54) INTEGRATION AGENT DEVICE FOR NODE INCLUDING MULTI-LAYERED EQUIPMENT AND FAULT MANAGEMENT METHOD THEREOF

(75) Inventors: Seung Hyun Yoon, Daejeon (KR); You Hyeon Jeong, Daejeon (KR); Hyung Seok Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 250 days.

(21) Appl. No.: 12/543,590

(22) Filed: Aug. 19, 2009

(65) Prior Publication Data
US 2010/0162051 A1 Jun. 24, 2010

(30) Foreign Application Priority Data
Dec. 22, 2008 (KR) .................. 10-2008-0131609

(51) Int. Cl.
*G06F 11/00* (2006.01)
(52) U.S. Cl.
USPC ............................................................ 714/57
(58) Field of Classification Search
USPC ................ 714/26, 47.1, 57; 709/223
See application file for complete search history.

(56) References Cited

U.S. PATENT DOCUMENTS

| | | | | |
|---|---|---|---|---|
| 6,072,777 | A * | 6/2000 | Bencheck et al. | 370/244 |
| 6,651,183 | B1 * | 11/2003 | Gensler et al. | 714/4.3 |
| 7,197,546 | B1 | 3/2007 | Bagga et al. | |
| 2003/0131118 | A1 | 7/2003 | Lee | |
| 2005/0137832 | A1 * | 6/2005 | Yemini et al. | 702/183 |
| 2009/0216903 | A1 * | 8/2009 | Howell et al. | 709/245 |
| 2011/0078163 | A1 * | 3/2011 | Veres et al. | 707/754 |

FOREIGN PATENT DOCUMENTS

| | | |
|---|---|---|
| KR | 1020010058117 | 7/2001 |
| KR | 2003-0060598 | 7/2003 |
| KR | 1020030057091 | 7/2003 |
| KR | 1020030058657 | 7/2003 |
| KR | 1020050080943 | 8/2005 |

OTHER PUBLICATIONS

Dictionary definition (wikipedia) of "sub-system", retrieved from http://en.wikipedia.org/wiki/Subsystem on May 16, 2013.*

* cited by examiner

*Primary Examiner* — Yair Leibovich
(74) *Attorney, Agent, or Firm* — Nelson Mullins Riley & Scarborough LLP

(57) ABSTRACT

An integration agent device and its fault management method for a node including multi-layered devices are disclosed to effectively control a node including two or more communication devices of different layers and integrally processing relevant fault information. The integration agent device includes: one or more control and management modules controlling and managing one or more communications network devices by layer; and an inter-layer interworking processing module integrating and processing information of the communications network devices by using inter-layer interworking information, and notifying a management system accordingly, wherein the information of the communications network devices is transmitted through the one or more control and management.

1 Claim, 3 Drawing Sheets

INTEGRATION AGENT DEVICE FOR NODE INCLUDING MULTI-LAYERED EQUIPMENT AND FAULT MANAGEMENT METHOD THEREOF

CROSS-REFERENCE TO RELATED APPLICATIONS

This application claims the priority of Korean Patent Application No. 2008-0131609 filed on Dec. 22, 2008, in the Korean Intellectual Property Office, the disclosure of which is incorporated herein by reference.

BACKGROUND OF THE INVENTION

1. Field of the Invention

The present application relates to an integration agent device capable of effectively controlling a node including multi-layered devices and integrally processing a fault, and the fault processing method thereof.

2. Description of the Related Art

In order to operate a communications network in which various communications devices are connected in a complex manner, operations for controlling the various devices constituting the communications network and managing faults generated by each device are essential.

In the related art communications network operations and fault management methods, each device is controlled, fault information is collected, the cause of a fault is analyzed, and proper measures are taken, through an element management system (EMS), a network management system (NMS), or a terminal configured for each communications network technique or for each layer.

Such communications network operations and fault management methods do not have control problems or fault management problems in existing networks with simple transport network and switching network hierarchies that are managed relatively statically.

However, current communications networks are evolving toward providing a much larger range of services based on changing Internet protocols (IPs), and because various lower layer networks are used, communications networks with multi-layered structures are being generated.

In more detail, an IP communications network may be configured by using diverse multi-layered communication techniques such as L0, L1, L2, L3/L4, and communications networks of each layer are configured to be overlaid. Thus, in a node (area), various devices, including a reconfigurable optical add and drop multiplexing (ROADM)/wavelength division multiplexing (WDM) devices and a router equipment processing the L3/L4 layer, are installed to interwork to provide communications services.

In communications networks with multi-layered structures, however, an alarm storm phenomenon whereby a lower layer fault spreads to an upper layer to rapidly increase fault information within a short time may occur, and in that event, considerable effort and time is required to analyze the actual cause of the fault.

In addition, although the communications network devices of the respective layers belong to a single node, they are separately managed, and worse, because the communications network devices are managed by an NMS or EMS in each layer, an upper management system manually maintains the correlation between communications network devices, through which the upper management system is able to analyze and recognize the cause of faults, and also it is not easy to properly perform a control and management operation.

SUMMARY OF THE INVENTION

Therefore, the present application is devised to solve a control management and fault management problem in a communications network with a multi-layered structure. An aspect of the present application provides an integration agent device for a node including multi-layered devices and its fault management method capable of effectively controlling a node including two or more communication devices of different layers and integrally processing relevant fault information.

According to an aspect of the present invention, there is provided an integration agent device for a node including multi-layered devices, the device comprising: one or more control and management modules controlling and managing one or more communications network devices by layer; and an inter-layer interworking processing module integrating and processing information of the communications network devices by using inter-layer interworking information, and notifying a management system accordingly, wherein the information of the communications network devices is transmitted through the one or more control and management.

The one or more control and management modules respectively connected to one or more communications network devices processing different layers in a single node, to perform a control and management plane function with respect to each communications network device or perform a relay function with a control/management plane of each communications network device.

The inter-layer interworking processing module processes a cooperative operation between the respective layers through the one or more control and management modules, integrates and processes the information of the communications network devices by using inter-layer interworking information, and notifies the management system accordingly.

When fault information is received from a communications network device, the inter-layer interworking processing module determines whether the received fault information has been created due to a fault of only a corresponding layer or whether it has been created due to a fault of a different layer which has spread, and if the received fault information has been created due to the fault of only the corresponding layer, the inter-layer interworking processing module processes the received fault information into node fault information, whereas if the received fault information has been created due to the fault of the different layer which has spread, the inter-layer interworking processing module extracts relevant fault information, processes node fault information, and provides the node fault information to the management system.

When the inter-layer interworking processing module processes the received fault information or relevant fault information into the node fault information, it changes the IP address of a device into a representative IP address of the node, in the received fault information or relevant fault information.

The inter-layer interworking processing module processes the relevant fault information of a lowermost layer into the node fault information and deletes fault information of other remaining layers so as not to notify the management information about it.

When the inter-layer interworking processing module processes the received fault information or relevant fault information into the node fault information, it changes a fault level of the fault information to a lower level.

According to an aspect of the present invention, there is also provided a fault management method of an integration agent device that relays a node including multi-layered devices of one or more communications network devices each handling a different layer and a management system, the method comprising: a reception step of receiving fault information notified from the one or more communications network devices; an integration and processing step of collecting the fault information and relevant fault information of a lower layer, integrating the fault information and the relevant fault information, and processing the integrated information into node fault information; and a notifying step of providing the node fault information to the management system.

The fault management method may further include: a recording step of recording the received fault information in a fault log.

The integration and processing step may include: determining whether the fault information has been created due to a fault of only a corresponding communications network equipment or whether it has been created due to a fault of a different layer which has spread; and if it is determined that the fault information has been created due to the fault of only the corresponding communications network equipment, processing the received fault information into node fault information, while if it is determined that the fault information has been created due to the fault of the different layer which has spread, processing relevant fault information into node fault information.

The integration and processing step may include: determining whether or not the fault information has been generated from an uppermost layer; if it is determined that the fault information has not been generated from the uppermost layer, recording the fault information in a temporary fault information and waiting for a pre-set time; when the pre-set time elapses, extracting the fault information and relevant fault information of a different layer from the temporary fault information by using inter-layer resource relevant information; if the fault information and the relevant fault information are not extracted from the temporary fault information, determining that the fault information has been integrated and terminating the operation, while if the fault information and the relevant fault information are extracted from the temporary fault information, processing the fault information and the relevant fault information into node fault information; if it is determined that the fault information has been generated from the uppermost layer according to the determination result, referring to a relevant fault of a lower layer by using the temporary fault information and the inter-layer resource relevant information; if there is no relevant fault of the lower layer upon reference, determining that the fault information has been created due to the fault of only the corresponding communications network equipment and processing it into node fault information; and if there is a relevant fault of the lower layer upon reference, determining that the fault information has been created due to a fault of a different layer, extracting information of the relevant fault, and processing it into node fault information.

In the step of processing fault information into the node fault information, the IP address of a device may be changed into a representative IP address of the node in the received fault information or relevant fault information, or only fault information of a lowermost layer may be processed into the node fault information in the relevant fault information, and fault information of the other remaining layers may be deleted or the fault level of the fault information of the other remaining layers may be changed to be lower.

BRIEF DESCRIPTION OF THE DRAWINGS

The above and other aspects, features and other advantages of the present application will be more clearly understood from the following detailed description taken in conjunction with the accompanying drawings, in which.

DETAILED DESCRIPTION OF THE PREFERRED EMBODIMENT

Figure 1:
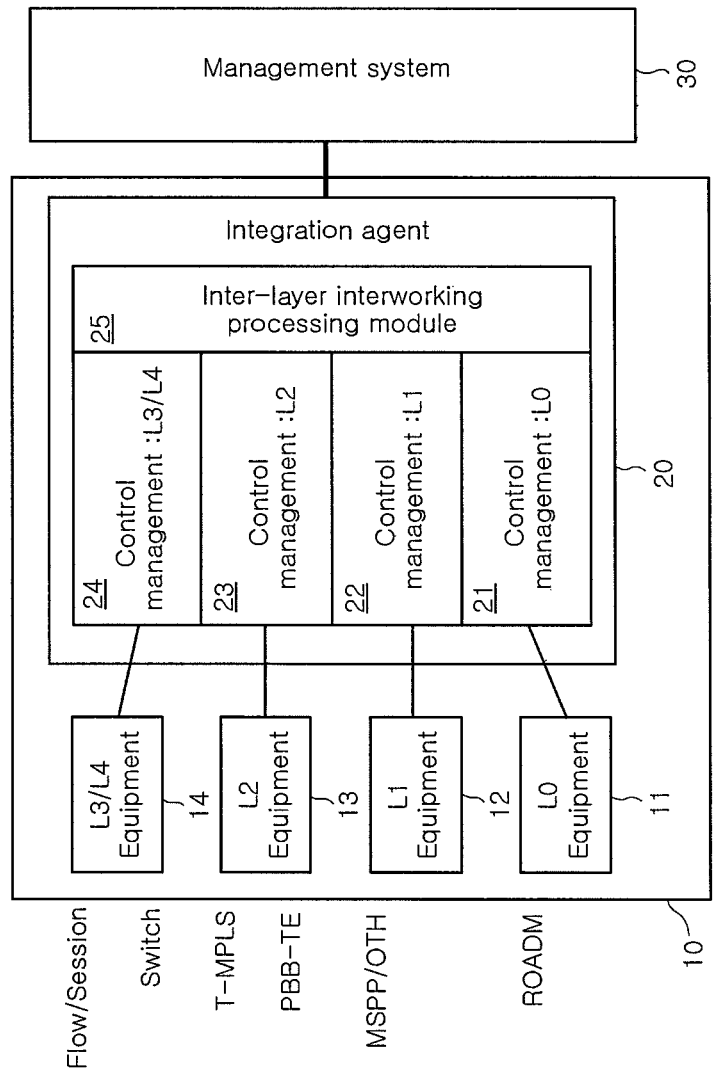
FIG. 1 is a schematic block diagram showing the configuration of an integration agent device according to an exemplary embodiment of the present invention.

Exemplary embodiments of the present application will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

In describing the present invention, if a detailed explanation for a related known function or construction is considered to unnecessarily divert the gist of the present invention, such explanation will be omitted but would be understood by those skilled in the art.

It will be understood that when an element is referred to as being "connected with" another element, it can be directly connected with the other element or intervening elements may also be present. In contrast, when an element is referred to as being "directly connected with" another element, there are no intervening elements present. In addition, unless explicitly described to the contrary, the word "comprise" and variations such as "comprises" or "comprising," will be understood to imply the inclusion of stated elements but not the exclusion of any other elements.

The term 'module' means a single unit for processing a particular function or operation and may be implemented by hardware, software, or a combination of hardware and software.

FIG. 1 is a schematic block diagram showing the configuration of an integration agent device according to an exemplary embodiment of the present invention.

With reference to FIG. 1, an integration agent device 20 according to an exemplary embodiment of the present application located in a node 10 and including one or more control and management modules 21 to 24 that are respectively connected to communications network devices 11 to 14 performing the processing of mutually different layers (e.g., L0, L1, L2, L3/L4) to perform a control and management plane function on each of the communications network devices 11 to 14 or to perform a relay function with a control/management plane of each of the communications network devices 11 to 14, and an inter-layer interworking processing module 25 that processes cooperative operations between the layers via the one or more control and management modules 21 to 24, corrects and processes information transmitted from the communications network devices 11 to 14 of mutually different layers, and transfers the corrected and processed information to a management system 30.

The integration agent device 20 processes information actually generated from the communications network devices 11 to 14 of the respective layers and transmits the processed information to the management system 30, and actually applies control from the management system 30 to each of the communications network devices 11 to 14 of the respective layers.

When the integration agent device 20, configured as described above, is installed at each node, it can integrally relay multi-layered control/management planes with respect to a single node 10 in which the integration agent device and packet and transmission devices are integrally formed (referred to as a 'packet-light integration node', hereinafter), thus facilitating the control and management of the packet-light integration node. In addition, the management system 30 such as a network management system (NMS), an element management system (EMS), or a provisioning server, can operate as if there is only one device having a multi-layered communication function in the packet-light integration node 10 through the integrated agent device 20, and accordingly, the management system 30 may control and manage the packet-light integration node 10 as a single device.

In particular, the integration agent device 20 processes a relationship between layers. Thus, when a fault is generated from a lower layer communications network device, the integration agent device 20 cuts off the transfer of the fault to an upper layer communications network device in order to restrain the generation of an alarm storm phenomenon, and provides only fault information corresponding to the actual cause of a fault to the management system 30 to allow the management system 30 to quickly take measures to remedy the fault. Even when a new route is established, resources can be optimally utilized by putting together multi-layered information relayed from the integration agent device 20.

To this end, when the inter-layer interworking processing module 25 is notified of fault information by the communications network devices 11 to 14, it determines whether the received fault information has been created due to a fault in a corresponding layer or whether it has been created due to a fault in a different layer which has spread. If the fault information has been created due to the fault of only the corresponding layer, the inter-layer interworking processing module 25 processes the received fault information into node fault information. If the fault information has been created due to a fault of a different layer which has spread, the inter-layer interworking processing module 25 extracts the relevant fault information, processes it into node fault information, and provides the node fault information to the management system 30.

In more detail, when the inter-layer interworking processing module 25 processes the fault information or the relevant fault information into the node fault information, it may change the IP address of a device into a representative IP address of the node, process only the fault information or the fault information of a lowermost layer in the relevant fault information into the node fault information while deleting the fault information of the other remaining layers so as to avoid notifying the management system 30 of erroneous fault information, or lower the fault level of the fault information.

In addition, the inter-layer interworking processing module 25 changes node control information on a predetermined node, generated by the management system 30, into device control information, and applies the device control information to a corresponding device. Thereafter, the inter-layer interworking processing module 25 processes the operation result of the corresponding device into node information, and notifies the management system 30 of the node information.

Figure 2:
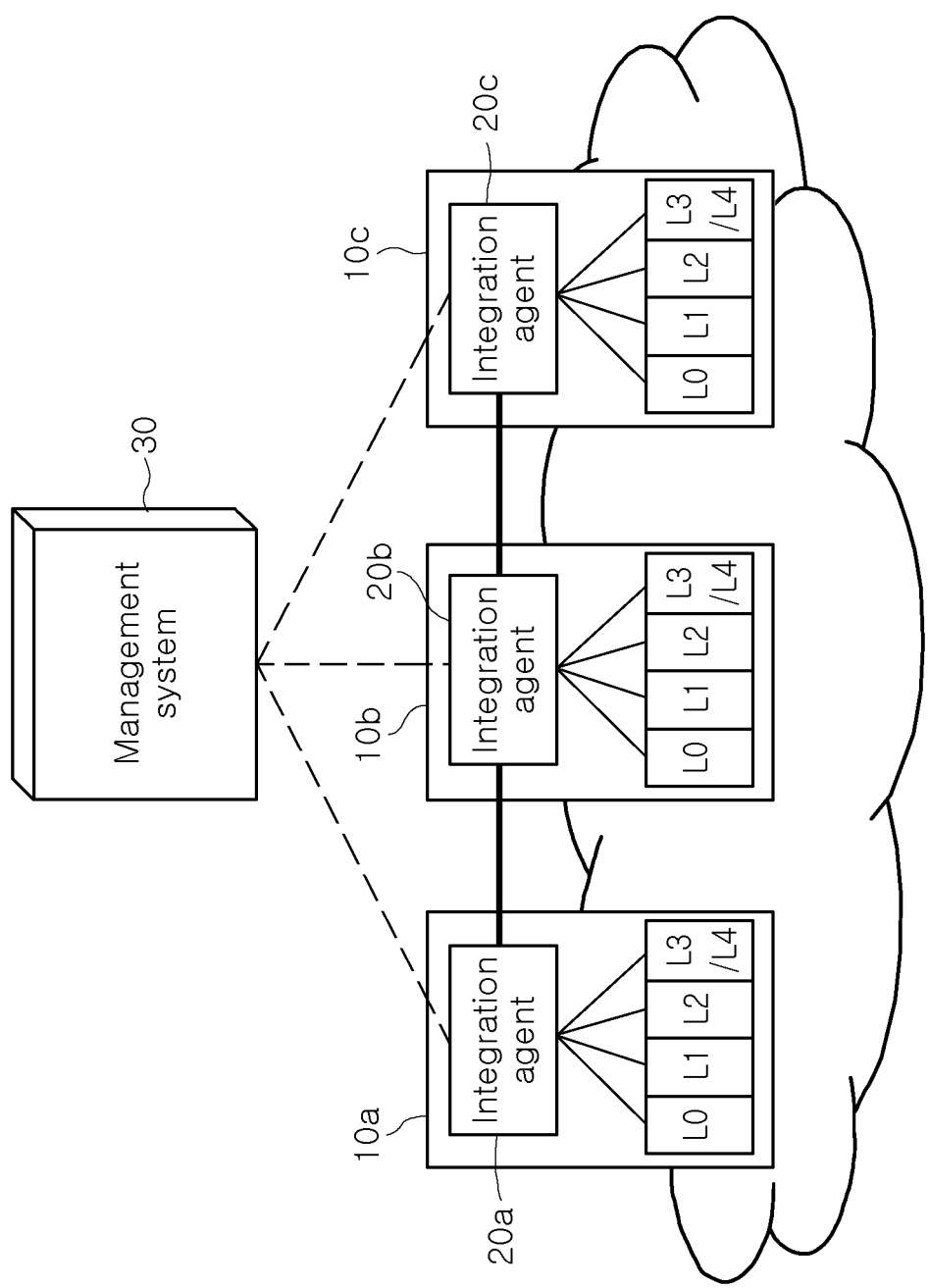
FIG. 2 illustrates a network structure employing the integration agent device according to an exemplary embodiment of the present invention.

FIG. 2 illustrates a network structure employing the integration agent device according to an exemplary embodiment of the present invention.

With reference to FIG. 2, integration agent devices 20*a*, 20*b*, and 20*c* are installed at integration nodes 10*a*, 10*b*, and 10*c*, each including one or more communications network devices of mutually different layers, respectively, to relay the control and management commands of the management system 30 with respect to the communications network devices of the layers of a corresponding integration node.

That is, the integration agent devices 20*a*, 20*b*, and 20*c* change device fault information, transmitted from the communications network devices of mutually different layers, into node fault information and notify the management system 30 of the node fault information. Alternatively, the integration agent devices 20*a*, 20*b*, and 20*c* may change node control information into device control information, apply the device control information to the corresponding device, process the operation result of the corresponding device into node information, and notify the management system accordingly.

As the above description, the integration agent devices 20*a*, 20*b*, and 20*c* installed respectively at the integration nodes 10*a*, 10*b*, and 10*c* may be integrated into a router/signaling network with respect to multi-layering through a single signaling control network (SCN).

In addition, it is noted that the operation and management structure of the multi-layered communications network devices can be simplified by the integration agent devices 20*a*, 20*b*, and 20*c*.

Figure 3:
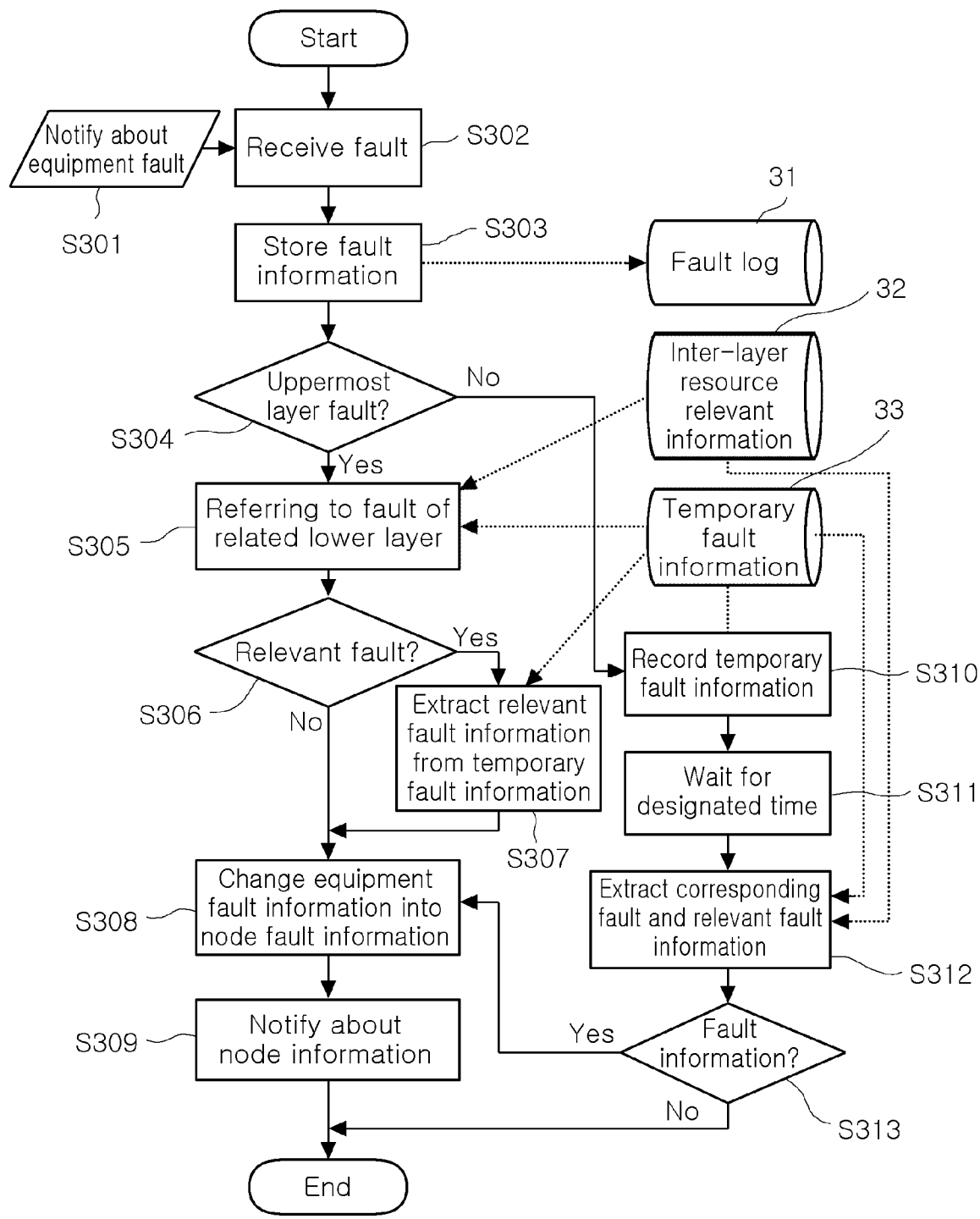
FIG. 3 is a flowchart illustrating the process of a fault management method in the integration agent device according to an exemplary embodiment of the present invention.

FIG. 3 is a flow chart illustrating the process of a fault management method in the integration agent device according to an exemplary embodiment of the present invention.

A fault management process in the integration agent device 20 will now be described with reference to FIG. 3.

When a fault notification is actually generated by the communications network devices 11 to 14 (S301), the integration agent device 20, installed in the corresponding integration node 10, receives the fault information from the notifying device (S302).

The integration agent device 20 stores the received fault information in a fault log 31 (S303).

The integration agent device 20 then collects relevant fault information from different layers related to the received fault information and integrates the fault information and the relevant fault information into node fault information. In this case, it is determined whether the received fault information has been created merely due to a fault of only a corresponding communications network device or whether it has been created because of a fault in a different layer which has spread. If the fault information has been merely created due to the fault of only the corresponding communications network equipment, the received fault information may be processed into node fault information. If the fault information has been created due to a fault of a different layer which has spread, the relevant fault information may be processed into node fault information.

The process as described above will now be explained in more detail with reference to FIG. 3.

First, the integration agent device 20 checks whether the received fault information is fault information regarding the uppermost layer (e.g., L3/L4 layer) (S304).

If the received fault information is checked to be fault information regarding the uppermost layer, it is checked whether or not there is a fault notification from a relevant lower layer communication equipment (S305). In detail, previously stored inter-layer resource related information 32 and temporary fault information 33 are referred to in order to check the relevant fault information at the lower layer related to the currently generated fault of the uppermost layer.

Upon referring to the previously stored inter-layer resource related information 32 and temporary fault information 33, if there is no relevant fault (S306), the integration agent device 20 determines that the currently generated fault information has been created merely due to the fault of only the corresponding uppermost layer, immediately changes the received fault information into node fault information (S308), and notifies the management system 30 accordingly (S309).

Conversely, upon referring to the previously stored inter-layer resource related information 32 and the temporary fault information 33, if there is a relevant fault (S306), the integration agent device 20 extracts the relevant fault information from the temporary fault information 33 (S307). In this case, the extracted relevant fault information is deleted from the temporary fault information 33. The integration agent device 20 then changes the extracted relevant fault information into node fault information (S308) and notifies the management system 30 accordingly (S309).

Upon checking whether the currently received fault information is determined to not be fault information of the upper most layer in step S304, the integration agent device 20 records the received fault information in the temporary fault information 33 (S310) and waits for a predetermined period of time to check whether fault spreads to an upper layer, so that relevant fault information is received from the upper layer (S311). After the pre-set time lapses, the integration agent device 20 extracts the corresponding fault and the relevant fault information from the temporary fault information 33 (S312) and checks whether or not the fault information has not been processed yet (S313).

If it is determined that the temporary fault information 33 does not have the received fault information or the relevant fault information in step S313, it means that the fault has spread to the upper layer and is processed in step S307, so the operation is terminated without any further processing. Conversely, if the received fault information and the relevant fault information still remain in the temporary fault information 33, it means that the fault has not spread to a different layer, so the integration agent device 20 changes the fault information or the relevant fault information into node fault information (S308) and notifies the management system 30 accordingly (S309). The fault information provided to the management system 30 is deleted from the temporary fault information 33.

In the above description, the processing of the fault information into the node fault information in step S308 may be performed by simply changing the IP address of the device into a representative IP address with respect to the integration node, changing only the fault information of a lowermost layer, the cause of the fault, into a node fault and notifying the fault management system 30 about it without notifying the fault management system 30 about fault information from the other remaining upper layers, or by lowering a fault level.

In addition, in this embodiment, the L3/L4 is illustrated as the uppermost layer, but there may be a node that does not have the communications network equipment of the L3/L4 layer according to circumstances. In this case, the second uppermost layer would be the uppermost layer.

Also, in this embodiment, the description has been limited to the fault management range, but the above-described process can be applied to all operations performed on the management control plane to allow the integration agent device to play a multi-layered integration role.

As set forth above, according to exemplary embodiments of the invention, because the integration agent effectively performs the multi-layered-related integration function, which is to be burdened by the management system to manage the multi-layered communications network, communications network management can be effectively performed, and the size and costs of the management system can be reduced.

While the present application has been shown and described in connection with the exemplary embodiments, it will be apparent to those skilled in the art that modifications and variations can be made without departing from the spirit and scope of the invention as defined by the appended claims.

What is claimed is:

1. A fault management method of an integration agent device that relays a node including multi-layered devices of one or more communications network devices each handling a different layer and a single management system, the method comprising:

a control and management step of controlling and managing the one or more communications network devices by layer with respective control and management modules, the network devices processing different communication layers;

a reception step of receiving fault information notified from the one or more communications network devices;

an integration and processing step of collecting the fault information and a relevant fault information of a lower layer, integrating the fault information and the relevant fault information, the integration and processing step processing device information into node fault information by:

determining whether or not the fault information has been generated from an uppermost layer;

if it is determined that the fault information has not been generated from the uppermost layer, recording the fault information in a temporary fault information and waiting for a pre-set time;

when the pre-set time elapses, extracting the fault information and relevant fault information of a different layer from the temporary fault information by using inter-layer resource relevant information;

if the fault information and the relevant fault information are not extracted from the temporary fault information, determining that the fault information has been integrated and terminating the integration and processing step, while if the fault information and the relevant fault information are extracted from the temporary fault information, processing the fault information and the relevant fault information into node fault information;

if it is determined that the fault information has been generated from the uppermost layer according to the determination result, referring to a relevant fault of a lower layer by using the temporary fault information and the inter-layer resource relevant information;

if there is no relevant fault of the lower layer upon reference, determining that the fault information has been created due to the fault of only a corresponding communications network equipment and processing it into node fault information; and if there is a relevant fault of the lower layer upon reference, determining that the fault information has been created due to a fault of a different layer, extracting information of the relevant fault, and processing it into node fault information; and a notifying step of providing the node fault information to the single management system.

* * * * *